United States Patent Office 3,649,720
Patented Mar. 14, 1972

3,649,720
O-ALKYL-O-(1-CARBOALKOXY - 1 - PROPEN-2-YL) PHOSPHOROCHLORIDATES AND PHOSPHOROTHIOCHLORODATES
Jean-Pierre Leber, Basel, Switzerland, assignor to Sandoz Ltd. (also known as Sandoz AG), Basel, Switzerland
No Drawing. Continuation-in-part of application Ser. No. 829,747, June 2, 1969. This application July 10, 1970, Ser. No. 53,983
Int. Cl. A01n 9/36; C07f 9/14, 9/20
U.S. Cl. 260—941     24 Claims

ABSTRACT OF THE DISCLOSURE

The invention concerns novel compounds of the formula:

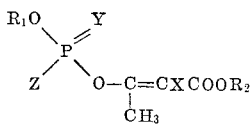

wherein each of $R_1$ and $R_2$ is alkyl of 1 to 5 carbon atoms, X is hydrogen, chlorine or bromine, Y is oxygen or sulphur, and Z is chlorine or bromine.

The compounds may be used as intermediates for the production of insecticidally, acaricidally and nematocidally active phosphoric acid esters.

---

This is a continuation in part of copending application Ser. No. 829,747, filed on June 2, 1969, now abandoned, and relates to new phosphoric acid ester halides of Formula I,

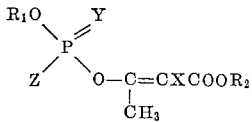

wherein
each of $R_1$ and $R_2$ is alkyl of 1 to 5 carbon atoms,
X is hydrogen, chlorine or bromine,
Y is oxygen or sulphur, and
Z is chlorine or bromine, as well as to processes for the production of these compounds. The compounds of Formula I may be used as intermediates for the production of insecticidally, acaricidally and nematocidally active phosphoric acid esters.

The compounds of Formula I may be obtained in accordance with the invention by (a) reacting a phosphoric acid halide of Formula II,

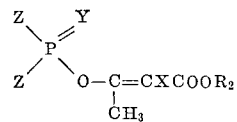

wherein $R_2$, X, Y and Z are as defined above, with an alcohol or alkali metal alcoholate of Formula III, $$R_1OQ \quad \text{III}$$

wherein
$R_1$ is as defined above, and
Q is hydrogen or an alkali metal, (b) reacting a compound of Formula IV,

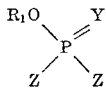

wherein $R_1$, Y and Z are as defined above, with a compound of Formula V, $$CH_3COCHXCOOR_2 \quad \text{V}$$

wherein $R_2$ and X are as defined above, in the presence of an acid acceptor.

The production of a compound of Formula I may conveniently be effected as follows:

In accordance with process (a) about 1.3 to 1.6 mols of a compound of Formula III, when Y in Formula II is oxygen, or 1 to 10 mols of an alcohol of Formula III, when Y in Formula II is sulphur, are added at a temperature of between —20° to +50° C., conveniently at room temperature, over a period of ½ hour to 2 hours, to 1 mol of a compound II, either without solvent or in an inert solvent, e.g. an aromatic hydrocarbon such as toluene or xylene, a halogenated hydrocarbon such as chlorobenzene or chloroform, a water-insoluble ether, or, when Y in Formula II is sulphur, optionally in an excess of compound III. The reaction mixture is subsequently stirred at 0° to 20° C. for about ½ hour to 2 hours. If the reaction is effected without solvent, the reaction mixture can subsequently be diluted with one of the solvents mentioned above and made neutral, e.g. with a solution of caustic soda, while cooling to —10° to —20° C. The reaction mixture may then be diluted with water and worked up in conventional manner.

In accordance with process (a) a mixture of an alcohol of Formula III with an equivalent amount of an acid acceptor, e.g. a tertiary base such as triethylamine or trimethylamine, may be added with stirring at a temperature between —10° and +5° C., over a period of 1 to 3 hours, to a compound of Formula II in an inert solvent, e.g. an aromatic hydrocarbon such as toluene or xylene, or an ether such as dioxane. The reaction mixture may subsequently be stirred at a temperature between 0° and —10° C. for about ½ hour to 2 hours. The precipitated amine hydrochloride may subsequently be filtered off and the resulting product worked up in conventional manner.

The reaction may likewise be effected with an alkali metal alcoholate, preferably $R_1ONa$, in place of the reaction with an alcohol of Formula III and an equivalent amount of an acid acceptor. An alkali metal alcoholate, preferably $R_1ONa$, in pulverized form or in suspension, preferably suspended in xylene, may be added at about 0° C. within 3 to 4 hours to a solution of a compound II in an inert solvent, e.g. an aromatic hydrocarbon such as toluene or xylene. The reaction mixture may subsequently be stirred at 0° C. for about two hours and further stirred without cooling for about 5 to 6 hours. The reaction product is conveniently rapidly washed with a sodium hydrogen carbonate solution and subsequently with water, dried and subsequently distilled.

In accordance with process (b) a compound of Formula V, wherein $R_2$ and X are as defined above, and an acid acceptor, e.g. triethylamine or trimethylamine, are added at —20° C. to room temperature, preferably at —10° to 0° C., within an hour to a compound of Formula IV, wherein $R_1$, Y and Z are as defined above. The reaction is initially effected either without solvent or with the addition of an inert organic solvent, e.g. an aromatic hydrocarbon such as toluene or xylene, a halogenated hydrocarbon such as chlorobenzene or chloroform, or an ether such as dioxane. When the reaction is initially effected without solvent, it is advantageous to add a small amount of solvent during the course of the reaction. The reaction mixture is subsequently stirred at approximately —10° to +10° C. for about 10 to 20 hours and is then worked up in conventional manner.

The compounds of Formula I are obtained as colourless oils which can be distilled in a high vacuum without decomposition.

The compounds II required as starting materials in process (a) are new and may be produced by reacting a phosphorus oxyhalide or phosphorus thiohalide of the formula $Y=P(Z)_3$, wherein Y and Z are as defined above, with an acetoacetic ester of Formula V, in the presence of an acid acceptor, e.g. triethylamine.

The starting materials of Formula IV are known and are described in the literature.

The compounds of Formula I produced in accordance with process (a) have a steric configuration in the crotonic acid radical, which is identical to that of the starting compounds of Formula II. The relationship of the stereoisomeric forms in the resulting compounds of Formula I may be determined in the usual manner by the nuclear magnetic resonance spectrum.

The compounds I of the invention are useful intermediates, e.g. in the preparation of compounds of the Formula VI,

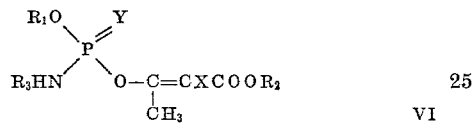

wherein $R_1$, $R_2$, X and Y have the above significance, and
$R_3$ is alkyl of 1 to 5 carbon atoms.

A compound of Formula VI may be obtained by reaction of a compound of Formula I with a compound of Formula VII,

wherein $R_3$ is as defined above, in the presence of an acid acceptor and in an inert solvent. In this process the solvent which is inert under the reaction conditions may be, for example, an aromatic hydrocarbon, e.g. toluene or xylene, a halogenated hydrocarbon, e.g. chlorobenzene or chloroform, or dioxane. The reaction may be carried out at a temperature of $-20°$ to $+50°$ C., preferably at $-10°$ C. to room temperature ($20°$ C.), during the course of ½ to 2 hours. It is preferred to use an approximately equimolar amount of the amine of general Formula VII, and of the compound of Formula V. It is also preferred to use an approximately equimolar amount of an acid acceptor, for example a tertiary nitrogen base, e.g. triethylamine, trimethylamine, dimethylaniline, diethylaniline, or sodium carbonate. The acid acceptor is conveniently added to the reaction mixture during the course of ½ to 2 hours. The solvent may be removed from the reaction mixture under vacuum at a bath temperature of approximately $20°$ to $50°$ C. when the reaction has been completed.

The compounds VI are useful pesticides, particularly the compounds wherein the —$CH_3$ group is cis to the —$COOR_2$ group in the crotonic acid moiety. More particularly, the compounds VI have insecticidal and acaracidal properties. Thus the compounds can be employed in combatting chewing and sucking insects and also spider mites. The compounds VI have a low toxicity in warm-blooded animals and a low phytotoxicity.

The compounds VI may be employed as pesticides in conventional manner in agriculture, inhabited rooms, cellars, attics, stables and also in the protection of plants and animals against insects, acarids and nematodes.

The combatting of insects and acarids can be carried out for example, by treating the objects to be protected with the active agent, preferably in combination with an inert diluent or carrier. For use as a plant-protecting agent or as a pesticide the compounds of Formula VI may be prepared in the form of a dusting or spraying agent, e.g. as a solution or dispersion in water or a suitable organic solvent, e.g. alcohol, petroleum, tar distillates etc., and preferably in combination with an emulsifying agent, e.g.

a liquid polyglycol ether derived from a high molecular weight alcohol, mercaptan or alkylphenol and an alkylene oxide. Suitable organic solvents, e.g. ketones, aromatic, optionally halogenated hydrocarbons, mineral oils etc., may also be added to the mixture as solution aids.

The spraying and dusting agents may contain the usual inert carrier material, e.g. talc, diatomaceous earth, bentonite, pumice, cellulose derivatives and the like, and the usual adhesives and wetting agents to improve adhesiveness and wettability.

The active material may be present in the formulations as a mixture with other known active agents. Formulations suitable for use in the application of a compound of Formula VI to a locus generally contain between 0.01 and 20% by weight of active agent depending upon the mode of application. Concentrates suitably contain between about 2% and 90% and preferably between 5% and 50% by weight of active ingredient.

The following examples illustrate the processes of the invention, but in no way limit the scope thereof. The temperatures are indicated in degrees centigrade.

EXAMPLE 1

O-methyl-O-(1-carbomethoxy-1-propen-2-yl)-phosphorothiochloridate (process a)

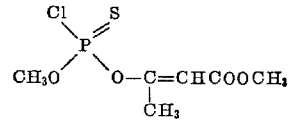

49.8 g. (0.2 mol) of O-(1-carbomethoxy-1-propen-2-yl)-thiophosphorodichloridate (relationship cis:trans in the crotonic acid radical 9:1) are added at a reaction temperature of $-5°$ to 64 g. (2 mols) of methanol. The temperature is subsequently allowed to rise to 10–12° and the mixture is kept at this temperature for ½ hour. The reaction mixture is subsequently diluted with 100 cc. of toluene and is made neutral with 40 cc. of a 20% aqueous caustic soda solution while stirring vigorously at $-10°$ to $-5°$. The reaction mixture is added to 200 cc. of ice water, the organic phase is separated, is washed well with a sodium hydrogen carbonate solution and subsequently with water, is dried with magnesium sulphate, filtered and concentrated by evaporation in a vacuum at 40°. Distillation in a high vacuum yields pure O-methyl-O-(1-carbomethoxy - 1-propen-2-yl)-phosphorothiochloridate, which has a B.P. of 46–48° at $10^{-3}$ mm. of Hg. The relationship of the isomers cis:trans in the crotonic acid radical amounts to 9:1. $n_D^{20}=1.504$.

*Analysis.*—Calcd. for $C_6H_{10}ClO_4PS$ (percent): Molecular weight, 2.44.6. C, 29.5; H, 4.1; Cl, 14.5; P, 12.7; S, 13.1. Found (percent): C, 29.4; H, 4.1; Cl, 14.9; P, 12.2; S, 12.9.

The O-(1-carbomethoxy-1-propen - 2 - yl)-thiophosphorodichloridate, used as starting material, may be produced as follows:

50.5 g. (0.5 mol) of triethylamine are added at 10° while stirring within ½ hour to a mixture of 84.5 g. (0.5 mol) of thiophosphoryl chloride and 58 g. (0.5 mol) of acetoacetic acid methyl ester, whereby triethylamine hydrochloride precipitates. The reaction mixture is subsequently stirred at a temperature between $-10°$ and $+10°$ for ½ hour, and at 20° for 15 minutes. 250 cc. of chloroform are then added to the reaction mixture, this is washed, and after drying the solvent is removed in a water jet vacuum at a bath temperature of 50°.

EXAMPLE 2

O-n-propyl-O-(1-carboisopropoxy-1-propen-2-yl)-phosphorochloridate (process a)

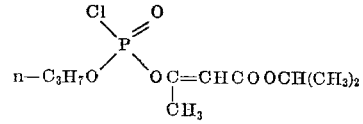

130.5 g. (0.5 mol) of cis-(1-carboisopropoxy-1-propen-2-yl)-phosphorodichloridate $$[Cl_2P(O)OC(CH_3)=CHCOOCH(CH_3)_2]$$

are dissolved in 200 cc. of toluene. A mixture of 33 g. (0.55 mol) of n-propanol and 55.6 g. (0.55 mol) of triethylamine in 50 cc. of toluene is added to this solution while stirring at $-10°$ within 1 hour. The reaction solution is stirred at 0° for a further hour and the triethylamine hydrochloride is subsequently filtered off. The filtrate is washed with a small amount of water and dried. Distillation in a high vacuum yields O-n-propyl-O-(1-carboisopropoxy - 1 - propen-2-yl)-phosphorochloridate having a B.P. of 70° at $10^{-2}$ mm. of Hg. $n_D^{20}=1.455$.

Analysis.— Calcd. for $C_{10}H_{18}ClO_5P$ (percent): Molecular weight, 284.7. C, 42.4; H, 6.4; Cl, 12.5; P, 10.9. Found (percent): C, 42.5; H, 6.2; Cl, 11.9; P, 11.4.

EXAMPLE 3

O-ethyl-O-(1-carbo-n-propoxy-1-propen-2-yl)-phosphorothiochloridate (process a)

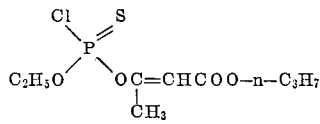

34 g. of pulverized sodium ethylate are added at 10° within 2 hours to 138.5 g. (0.5 mol) of cis-(1-carbo-n-propoxy - 1 - propen - 2 - yl)-thiophosphorodichloridate $[Cl_2P(S)OC(CH_3)=CHCOO-n-C_3H_7]$, dissolved in 400 cc. of toluene. The reaction mixture is stirred at 10° for 3 hours, the resulting product is washed with cold water, is subsequently dried and distilled. Cis-O-ethyl-O-(1 - carbo-n-propoxy - 1 - propen-2-yl)-phosphorothiochloridate, having a B.P. of 60–62° at 0.5 mm. of Hg, is obtained.

Analysis.—Calcd. for $C_9H_{16}ClO_4PS$ (percent): Molecular weight, 286.7. C, 37.7; H, 5.6; P, 10.8; S, 11.2. Found (percent): C, 37.4; H, 5.4; P, 10.7; S, 11.3.

EXAMPLE 4

O-ethyl-O-(1-carbomethoxy-1-propen-2-yl)-phosphorothiochloridate (process b)

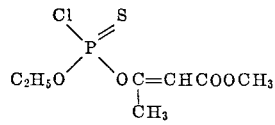

30.5 g. (0.3 mol) of triethylamine are added at 10–12° while stirring within 1 hour to a mixture of 53.7 g. (0.3 mol) of O-ethyl-phosphorothioate dichloride (Formula IV: $R_1=C_2H_5$, Y=S, Z=Cl) and 34.8 g. (0.3 mol) of acetoacetic acid methyl ester, and after the addition of half of the triethylamine, 50 cc. of toluene are added. The reaction mixture is subsequently stirred at 10° for a further 2 hours, and at 20° for 17 hours. The precipitated triethylamine hydrochloride is subsequently filtered off. The filtrate is washed with water, dried, filtered and concentrated by evaporation in a vacuum at 40°. Distillation in a high vacuum yields pure O-ethyl-O-(1-carbomethoxy - 1-propen-2-yl)-phosphorothiochloridate. B.P. 53° at 0.03 mm. of Hg. The relationship of the isomers cis:trans in the crotonic acid radical amounts to 9:1. $n_D^{20}=1.496$.

Analysis.—Calcd. for $C_7H_{12}ClO_4PS$ (percent): Molecular weight, 258.7. C, 32.5; H, 4.7; Cl, 13.7; P, 12.0; S, 12.4. Found (percent): C, 32.1; H, 5.0; Cl, 14.2; P, 12.0; S, 13.2.

EXAMPLE 5

O-n-propyl-O-(1-carbomethoxy-1-propen-2-yl)-phosphorochloridate (process b)

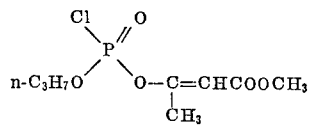

30.5 g. (0.3 mol) of triethylamine are added at $-10°$ while stirring within 1 hour to a mixture of 53.1 g. (0.3 mol) of O-n-propyl-phosphorodichloride (Formula IV: $R_1=n-C_3H_7$, Y=O, Z=Cl) and 34.8 g. (0.3 mole) of acetoacetic acid methyl ester, and in case a strong amount of precipitate results, 50 cc. of toluene are added. The reaction mixture is subsequently stirred at 0° for a further 15 hours. The precipitated triethylamine hydrochloride is subsequently filtered off. The filtrate is washed several times with a small amount of water, is then dried, filtered and concentrated by evaporation in a vacuum at 40°. The aqueous phase is extracted twice with 50 cc. amounts of chloroform and after drying the chloroform extract is concentrated by evaporation. Distillation in a high vacuum yields pure O-n-propyl-O-(1-carbomethoxy-1-propen-2-yl)-phosphorochloride. B.P. 67° at 0.05 mm. of Hg. The relationship of the isomers cis:trans in the crotonic acid radical amounts to 1:2. $n_D^{20}=1.460$.

Aanlysis.—Calcd. for $C_8H_{14}ClO_4P$ (percent): Molecular weight, 256.6. C, 37.4; H, 5.5; Cl, 13.8; P, 12.1. Found (percent): 38.0; H, 5.7; Cl, 13.0; P, 12.2.

The following compounds of Formula I are obtained in a manner analogous to that described in Examples 1 to 5. The starting materials for the following compounds are produced in a manner analogous to that described in Example 1:

| Ex. | $R_1$ | $R_2$ | X | Y | Z | Empirical formula | Molecular weight | B.P., mm. of Hg $10^{-2}$ | $n_D^{20}$ | Relationship cis:trans in the crotonic acid radical | Calculated C | H | Cl | P | S | Found C | H | Cl | P | S |
|---|---|---|---|---|---|---|---|---|---|---|---|---|---|---|---|---|---|---|---|---|
| 6 | $CH_3$ | $CH_3$ | H | O | Cl | $C_6H_{10}ClO_5P$ | 228.6 | 51–53/5 | 1,459 | Cis | 31.5 | 4.4 | 15.5 | 13.6 | | 31.4 | 4.6 | 15.5 | 13.1 | |
| 7 | $CH_3$ | $C_2H_5$ | H | O | Cl | $C_7H_{12}ClO_5P$ | 242.6 | 65/5 | 1,459 | 9:1 | 34.7 | 5.0 | 14.6 | 12.8 | | 34.3 | 4.6 | 13.9 | 12.2 | |
| 8 | $CH_3$ | $iC_3H_7$ | H | O | Cl | $C_8H_{14}ClO_5P$ | 256.6 | 54–55/0.5 | 1,457 | 95:5 | 37.4 | 5.5 | 13.8 | 12.1 | | 38.0 | 5.6 | 14.2 | 11.8 | |
| 9 | $C_2H_5$ | $C_2H_5$ | Cl | O | Cl | $C_8H_{13}Cl_2O_5P$ | 291.1 | 68/2 | 1,472 | 9:1 | 33.0 | 4.5 | 24.4 | 10.6 | | 33.3 | 4.6 | 24.7 | 10.4 | |
| 10 | $iC_3H_7$ | $C_2H_5$ | Cl | O | Cl | $C_9H_{15}Cl_2O_5P$ | 305.1 | 68–70/0.5 | 1,470 | 9:1 | 35.4 | 5.0 | 23.2 | 10.2 | | 36.0 | 5.4 | 23.2 | 9.7 | |
| 11 | $CH_3$ | $C_2H_5$ | H | S | Cl | $C_7H_{12}ClO_4PS$ | 258.7 | 58/0.5 | 1,496 | Cis | 32.5 | 4.7 | 13.7 | 12.0 | 12.4 | 32.2 | 4.9 | 14.1 | 11.4 | 12.7 |
| 12 | $CH_3$ | $iC_3H_7$ | H | S | Cl | $C_8H_{14}ClO_4PS$ | 272.7 | 54–58 | 1,492 | Cis | 35.2 | 5.2 | 13.0 | 11.4 | 11.8 | 35.7 | 5.1 | 12.8 | 11.4 | 12.0 |
| 13 | $C_2H_5$ | $iC_3H_7$ | H | S | Cl | $C_9H_{16}ClO_4PS$ | 286.7 | 52–53 | 1,488 | 9:1 | 37.7 | 5.6 | 10.8 | 11.2 | 12.4 | 37.8 | 5.7 | 11.1 | 11.7 | 12.9 |
| 14 | $nC_3H_7$ | $iC_3H_7$ | H | S | Cl | $C_{10}H_{18}ClO_4PS$ | 300.7 | 82–84 | 1,484 | Cis | 39.9 | 6.0 | 11.8 | 10.3 | 10.7 | 39.2 | 6.0 | 10.8 | 10.6 | 10.5 |
| 15 | $nC_3H_7$ | $CH_3$ | H | S | Cl | $C_8H_{14}ClO_4PS$ | 272.7 | 56/0.5 | 1,495 | 95:5 | 35.2 | 5.2 | 13.0 | 11.4 | 11.8 | 36.5 | 5.5 | 13.3 | 12.1 | 12.2 |
| 16 | $CH_3$ | $C_2H_5$ | Cl | S | Cl | $C_7H_{11}Cl_2O_4PS$ | 293.1 | 72–74/0.5 | 1,510 | 9:1 | 28.7 | 3.8 | 24.0 | 10.6 | 10.9 | 29.1 | 4.1 | 23.2 | 10.0 | 11.0 |
| 17 | $iC_3H_7$ | $C_2H_5$ | Cl | S | Cl | $C_9H_{15}Cl_2O_4PS$ | 321.2 | 72/0.5 | 1,500 | 9:1 | 33.7 | 4.7 | 22.1 | 9.7 | 10.9 | 34.1 | 4.9 | 21.8 | 9.4 | 10.1 |
| 18 | $nC_5H_{11}$ | $C_2H_5$ | Cl | S | Cl | $C_{11}H_{19}Cl_2O_4PS$ | 349.2 | 92/0.5 | 1,495 | 9:1 | 37.8 | 5.5 | 20.3 | 8.9 | 9.2 | 38.2 | 5.5 | 19.8 | 9.5 | 9.3 |
| 19 | $C_2H_5$ | $C_2H_5$ | H | S | Cl | $C_8H_{14}ClO_4PS$ | 272.7 | 60 | 1,493 | 95:5 | 35.2 | 5.2 | | 11.4 | 11.8 | 35.3 | 5.4 | | 11.7 | 11.9 |
| 20 | $nC_3H_7$ | $C_2H_5$ | H | S | Cl | $C_9H_{16}ClO_4PS$ | 286.7 | 61–63 | 1,491 | Cis | 37.8 | 5.6 | | 10.8 | 11.2 | 37.9 | 5.5 | | 11.1 | 11.1 |
| 21 | $nC_4H_9$ | $C_2H_5$ | H | S | Cl | $C_9H_{16}ClO_4PS$ | 286.7 | 60–64/0.5 | 1,490 | Cis | 37.8 | 5.6 | | 10.8 | 11.2 | 37.7 | 5.5 | | 10.9 | 11.1 |
| 22 | $iC_3H_9$ | $CH_3$ | H | S | Cl | $C_9H_{16}ClO_4PS$ | 286.7 | 65–67/2 | 1,491 | 90:10 | 37.8 | 5.6 | | 10.8 | 11.2 | 36.9 | 5.3 | | 11.1 | 12.1 |
| 23 | $iC_3H_7$ | $CH_3$ | H | S | Cl | $C_8H_{14}ClO_4PS$ | 272.7 | 61–63 | 1,492 | 95:5 | 35.2 | 5.2 | | 11.4 | 11.8 | 35.3 | 5.2 | | 11.7 | 11.7 |

What is claimed is:
1. A phosphoric acid ester halide of the formula:

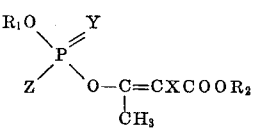

wherein each of $R_1$ and $R_2$ is alkyl of 1 to 5 carbon atoms, X is hydrogen, chlorine or bromine, X is oxygen or sulphur, and Z is chlorine or bromine.

2. The compound of claim 1, wherein $R_1$ is methyl, $R_2$ is methyl, X is hydrogen, Y is sulphur, and Z is chlorine.

3. The compounds of claim 1, wherein $R_1$ is n-propyl, $R_2$ is isopropyl, X is hydrogen, Y is oxygen, and Z is chlorine.

4. The compound of claim 1, wherein $R_1$ is ethyl, $R_2$ is n-propyl, X is hydrogen, Y is sulphur, and Z is chlorine.

5. The compound of claim 1, wherein $R_1$ is ethyl, $R_2$ is methyl, X is hydrogen, Y is sulphur, and Z is chlorine.

6. The compound of claim 1, wherein $R_1$ is n-propyl, $R_2$ is methyl, X is hydrogen, Y is oxygen, and Z is chlorine.

7. The compound of claim 1, wherein $R_1$ is methyl, $R_2$ is methyl, X is hydrogen, Y is oxygen, and Z is chlorine.

8. The compound of claim 1, wherein $R_1$ is methyl, $R_2$ is ethyl, X is hydrogen, Y is oxygen, and Z is chlorine.

9. The compound of claim 1, wherein $R_1$ is methyl, $R_2$ is isopropyl, X is hydrogen, Y is oxygen, Z is chlorine.

10. The compound of claim 1, wherein $R_1$ is ethyl, $R_2$ is ethyl, X is chlorine, Y is oxygen, and Z is chlorine.

11. The compound of claim 1, wherein $R_1$ is isopropyl, $R_2$ is ethyl, X is chlorine, Y is oxygen, and Z is chlorine.

12. The compound of claim 1, wherein $R_1$ is methyl, $R_2$ is ethyl, X is hydrogen, Y is sulphur, and Z is chlorine.

13. The compound of claim 1, wherein $R_1$ is methyl, $R_2$ is isopropyl, X is hydrogen, Y is sulphur, and Z is chlorine.

14. The compound of claim 1, wherein $R_1$ is ethyl, $R_2$ is isopropyl, X is hydrogen, Y is sulphur, and Z is chlorine.

15. The compound of claim 1, wherein $R_1$ is n-propyl, $R_2$ is isopropyl, X is hydrogen, Y is sulphur, and Z is chlorine.

16. The compound of claim 1, wherein $R_1$ is n-propyl, $R_2$ is methyl, X is hydrogen, Y is sulphur, and Z is chlorine.

17. The compound of claim 1, wherein $R_1$ is methyl, $R_2$ is ethyl, X is chlorine, Y is sulphur, and Z is chlorine.

18. The compound of claim 1, wherein $R_1$ is isopropyl, $R_2$ is ethyl, X is chlorine, Y is sulphur, and Z is chlorine.

19. The compound of claim 1, wherein $R_1$ is n-pentyl, $R_2$ is ethyl, X is chlorine, Y is sulphur, and Z is chlorine.

20. The compound of claim 1, wherein $R_1$ is ethyl, $R_2$ is ethyl, X is hydrogen, Y is sulphur, and Z is chlorine.

21. The compound of claim 1, wherein $R_1$ is n-propyl, $R_2$ is ethyl, X is hydrogen, Y is sulphur, and Z is chlorine.

22. The compound of claim 1, wherein $R_1$ is n-butyl, $R_2$ is methyl, X is hydrogen, Y is sulphur, Z is chlorine.

23. The compound of claim 1, wherein $R_1$ is isobutyl, $R_2$ is methyl, X is hydrogen, Y is sulphur, and Z is chlorine.

24. The compound of claim 1, wherein $R_1$ is isopropyl, $R_2$ is methyl, X is hydrogen, Y is sulphur, and Z is chlorine.

References Cited
UNITED STATES PATENTS 3,014,838   12/1961   Stiles et al. _____ 260—941 X HENRY R. JILES, Primary Examiner R. L. RAYMOND, Assistant Examiner U.S. Cl. X.R.

260—969, 973, 984; 424—212